United States Patent [19]
Pham

[11] Patent Number: 5,875,964
[45] Date of Patent: Mar. 2, 1999

[54] REUSABLE BUSINESS ENVELOPE

[76] Inventor: Nghiem K. Pham, 3816 Longfellow Ave., Minneapolis, Minn. 55407

[21] Appl. No.: 889,792

[22] Filed: Jul. 10, 1997

[51] Int. Cl.$^6$ .................................................. B65D 27/06
[52] U.S. Cl. .......................... 229/303; 229/302; 229/313
[58] Field of Search .................................... 229/301, 302, 229/303, 305, 306, 313

[56] References Cited

U.S. PATENT DOCUMENTS

| | | | |
|---|---|---|---|
| 1,091,172 | 3/1914 | Thayer | 229/302 |
| 2,044,541 | 6/1936 | Nigoul | 229/313 |
| 3,498,528 | 3/1970 | Klein | 229/302 |
| 3,512,702 | 5/1970 | Pritchard, Jr. | 229/302 |
| 3,982,689 | 9/1976 | Retrum | 229/313 X |
| 4,715,531 | 12/1987 | Stewart et al. | |
| 4,730,768 | 3/1988 | Gendron | |
| 4,819,807 | 4/1989 | Giger | 229/313 |
| 5,277,362 | 1/1994 | Wilson | |
| 5,328,092 | 7/1994 | File | |
| 5,400,957 | 3/1995 | Stude | |
| 5,642,855 | 7/1997 | Michlin | 229/313 X |

Primary Examiner—Jes F. Pascua
Attorney, Agent, or Firm—Richard L. Miller, P.E.

[57] ABSTRACT

A reusable business envelope having an initial mailing modality where it is initially used and a return mailing modality where it is again used. The envelope includes a front panel, a pair of side panels, a rear panel, a first detachable strip, a return flap, and a second detachable strip. The pair of side flaps and the rear panel are foldably mounted to the front panel. The first detachable strip is detachably mounted to the rear panel. The return flap is foldably mounted to the front panel. The second detachable strip is detachably mounted to the return flap. The second detachable strip is folded downwardly onto the outer surface of the first detachable strip and is adhered thereto by adhesive on the inner surface of the second detachable strip when the reusable business envelope is in its initial mailing modality, with the reusable business envelope achieving its return mailing modality by the sideward pulling of one tab of the pair of first pull tabs of the first detachable strip and an adhered tab of the pair of second pull tabs of the second detachable strip as a unit, causing the first detachable strip and the adhered second detachable strip to be removed as a unit by severing the first and second perforation lines and thereby exposing the open top of the receptacle for insertion of another piece of correspondence, with the return flap folded downwardly onto the outer surface of the rear panel, and adhered thereto by the adhesive on the inner surface of the return flap.

28 Claims, 1 Drawing Sheet

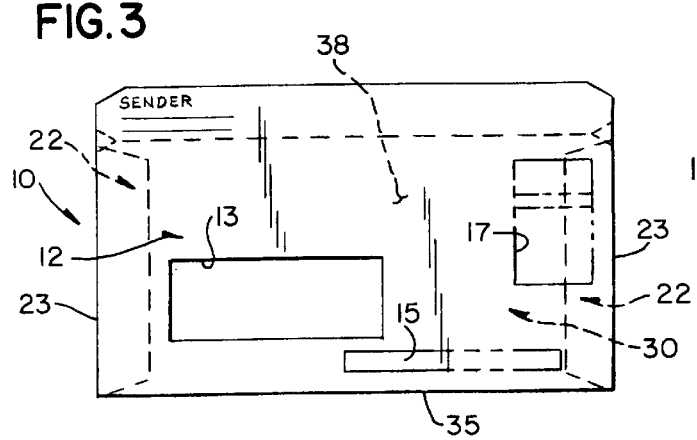
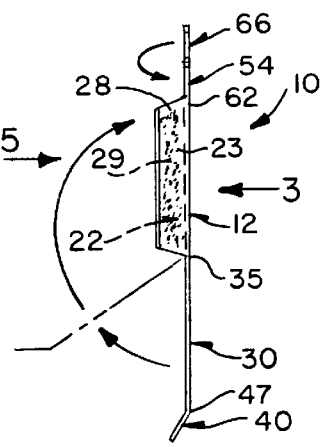
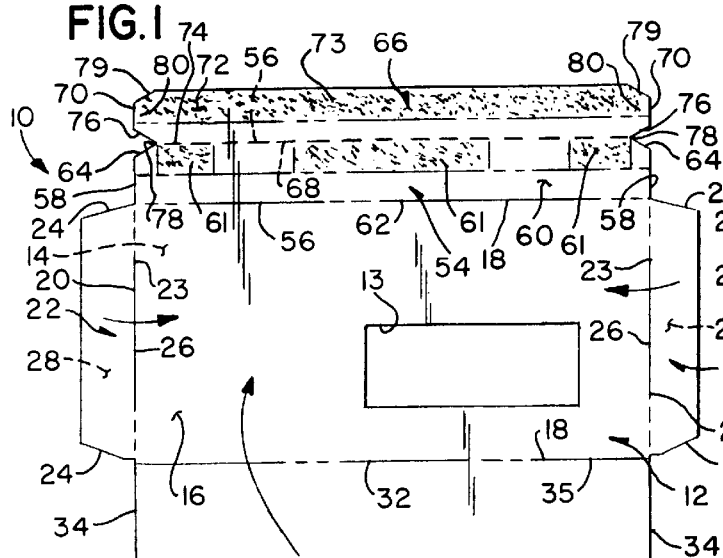
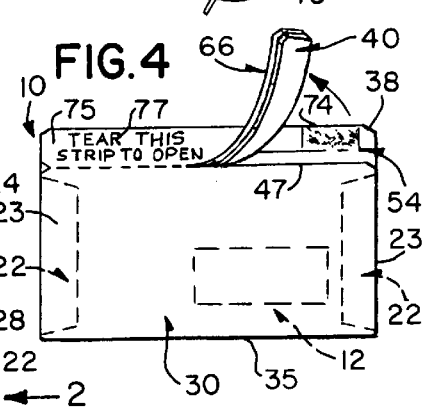
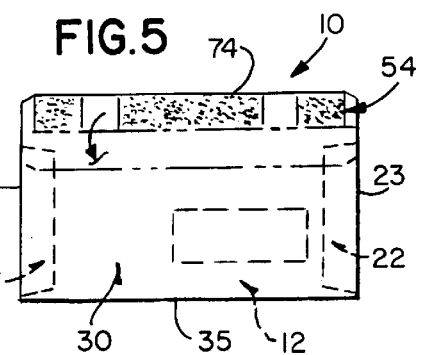

REUSABLE BUSINESS ENVELOPE

BACKGROUND OF THE INVENTION

1. Field of the Invention

The present invention relates to an envelope. More particularly, the present invention relates to a reusable business envelope.

2. Description of the Prior Art

Numerous innovations for reusable envelopes have been provided in the prior art that will be described. Even though these innovations may be suitable for the specific individual purposes to which they address, however, they differ from the present invention FOR EXAMPLE, U.S. Pat. No. 4,715,531 to Stewart et al. teaches a remailable envelope that is constructed of a single sheet folded in half having perforations spaced inward from the non-folded edges. A flap fold is spaced inward parallel to the perforation at the perforation at the free edge of the back. Adhesive extends between the centerfold and the flap fold on the inner surface of the detachable lateral portions between the perforations and the lateral edges. Adhesive strips with release sheets are attached to the outer back face inside the perforations. Adhesives strips with release sheets are attached to an inside of the flap on the detachable portion between the perforation and the terminal edge. Adhesive strips with release covers are applied to the outer face of the flap inside the perforations. The envelope is preaddressed on the outer front face and may be preaddressed and stamped as a return envelope on the inner front face. In use the flap is folded down and material is placed inside the envelope. The release strip is peeled from the inside of the flap portion and the flap is folded up and the detachable portions outside the perforation at the terminal edges are pressed together. The envelope is mailed. Upon receipt one tears the envelope at the perforations and removes the peripheral portions. To reuse the envelope, one removes the release sheets on the lateral adhesive strips, reverses the central fold, exposing the new face, and presses the lateral portions together making a remailable envelope.

ANOTHER EXAMPLE, U.S. Pat. No. 4,730,768 to Gendron teaches a remailable envelope which comprises first and second extensions attached to the front and rear panels and first and second closure flaps attached to the first and second extensions. The nominal height of the rear wall is greater than the nominal height of the front wall, however, by selectively folding the envelope panels about the score lines provided for the first and second extensions, and first and second closure flaps, the envelope structure for the remailing can be made smaller than the envelope structure for the first mailing use.

STILL ANOTHER EXAMPLE, U.S. Pat. No. 5,277,362 to Wilson teaches a reusable envelope for the delivery of mail and the return delivery of a response. The reusable envelope includes a single sheet of a selected material with various folds to achieve an envelope similar to a standard envelope. A front panel is defined at a central portion of the sheet. A first wing portion and a back portion are folded and secured to one another. A top flap portion extends from the front panel and may be folded toward the back portion to facilitate sealing the reusable envelope for original delivery. A second wing portion extends from the back portion and is folded and removably secured to a portion of the front panel. An opening is revealed for the withdrawal and placement of selected articles to be delivered upon removal of the second wing portion. A sealing flap is provided for sealing the opening for return delivery of the reusable envelope. Windows may be provided at selected locations along the front panel and second wing portion to facilitate the viewing of send and/or return addresses printed upon the contents within the reusable envelope.

YET ANOTHER EXAMPLE, U.S. Pat. No. 5,328,092 to File teaches a reusable mailer type business form that has an initial mailing configuration addressed to an outgoing addressee and a reply mailing configuration addressed to a reply addressee. The mailer complies with the postal requirement that no part of the outgoing address or postage (including postal service applied bar coding) appear on the mailer in the reply configuration. The mailer includes a front opaque ply with at least one cut-out, and at least one removable strip adjacent an edge, including a perforation line. Postage indicia are visible at the upper right-hand corner of the front ply. A rear opaque ply has a fold line adjacent an edge, and coincident with the perforation line of the front ply. A flap is defined between the fold line and the adjacent edge. At least one insert ply (between the front and rear plies) having outgoing address information visible through the cutout when the mailer is in the initial mailing configuration is provided. Various structures are provided for rendering non-viewable all outgoing addressee postage information when the mailer is converted between the initial and reply configurations. Such structure can be a second removable strip adjacent a different edge than the first removable strip, or a second cutout provided in the front ply for viewing the outgoing postage (on the insert ply).

FINALLY, STILL YET ANOTHER EXAMPLE, U.S. Pat. No. 5,400,957 to Stude teaches a reusable mailing envelope that is constructed from a blank comprising a front panel having an inner surface and an outer surface and a rear panel having an inner surface and an outer surface and being connected to the front panel along a first fold line. A seal flap formation is coupled to one of the panels along a second line spaced from the first fold line and includes a seal flap having adhesive on an inner surface thereof for adhering the seal flap to one of the panels in a first mailing condition. The seal flap formation further includes a first seal flap section having an inner surface and an outer surface and being connected along a third line to the seal flap and a second seal flap section having an inner surface and an outer surface and being connected along a fourth fold line to the first seal flap section and being coupled along the second line to one of the panels. Structure is provided for securing the front and rear panels together along adjacent side edges thereof. Also, reusable structure is provided for allowing the envelope to be reused as a mailing envelope and is coupled to one of the panels. The reusable structure includes at least a part of at least one of the first or second seal flap sections. The reusable structure has the first mailing condition when initially mailed and a second condition wherein at least a portion of one of the seal flap sections of the reusable structure forms a resealing flap which is sealed to at least one surface of the envelope for remailing the reusable envelope. At least one of the first and second seal flap sections having adhesive on and extending at least partially across said inner surface thereof parallel to said third and fourth lines and at least a part of at least one of the seal flap sections being detachable from the envelope.

It is apparent that numerous innovations for reusable envelopes have been provided in the prior art that are adapted to be used. Furthermore, even though these innovations may be suitable for the specific individual purposes to which they address, however, they would not be suitable for the Purposes of the present invention as heretofore described.

SUMMARY OF THE INVENTION

ACCORDINGLY, AN OBJECT of the present invention is to provide a reusable business envelope that avoids the disadvantages of the prior art.

ANOTHER OBJECT of the present invention is to provide a reusable business envelope that is simple and inexpensive to manufacture.

STILL ANOTHER OBJECT of the present invention is to provide a reusable business envelope that is simple to use.

BRIEFLY STATED, YET ANOTHER OBJECT of the present invention is to provide a reusable business envelope having an initial mailing modality where it is initially used and a return mailing modality where it is again used. The envelope includes a front panel, a pair of side panels, a rear panel, a first detachable strip, a return flap, and a second detachable strip. The pair of side flaps and the rear panel are foldably mounted to the front panel. The first detachable strip is detachably mounted to the rear panel. The return flap is foldably mounted to the front panel. The second detachable strip is detachably mounted to the return flap. The second detachable strip is folded downwardly onto the outer surface of the first detachable strip and is adhered thereto by adhesive on the inner surface of the second detachable strip when the reusable business envelope is in its initial mailing modality, with the reusable business envelope achieving its return mailing modality by the sideward pulling of one tab of the pair of first pull tabs of the first detachable strip and an adhered tab of the pair of second pull tabs of the second detachable strip as a unit, causing the first detachable strip and the adhered second detachable strip to be removed as a unit by severing the first and second perforation lines and thereby exposing the open top of the receptacle for insertion of another piece of correspondence, with the return flap folded downwardly onto the outer surface of the rear panel, and adhered thereto by the adhesive on the inner surface of the return flap.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic front elevational view of the present invention prior to assembly;

FIG. 2 is a diagrammatic side elevational view taken generally in the direction of arrow 2 in FIG. 1;

FIG. 3 is a diagrammatic front elevational view of the present invention in its initial mailing modality;

FIG. 4 is a diagrammatic rear elevational view of the present invention in its initial mailing modality and being opened; and FIG. 5 is a diagrammatic rear elevational view of the present invention achieving its return mailing modality.

LIST OF REFERENCE NUMERALS UTILIZED IN THE DRAWING 10 reusable business envelope of the present invention
12 front panel
13 first window of front panel 12
14 outer surface of front panel 12
15 second window of front panel 12
16 inner surface of front panel 12
17 third window of front panel 12
18 pair of long edges of front panel 12
20 pair of short edges of front panel 12
22 pair of side flaps
23 side fold line
24 chamfered short ends of pair of side flaps 22
26 long edge of each side flap of pair of side flaps 22
28 outer surface of each side flap of pair of side flaps 22
29 adhesive on outer surface 28 of each side flap of pair of side flaps 22
30 rear panel
32 pair of long edges of rear panel 30
34 pair of short edges of rear panel 30
35 bottom fold line
36 chamfered extremes of upper most long edge of pair of long edges 32 of rear panel 30.
37 outer surface of rear panel 30
38 receptacle
40 first detachable strip
42 pair of long edges of first detachable strip 40
43 inner surface of first detachable strip 40
44 pair of short edges of first detachable strip 40
45 outer surface of first detachable strip 40
46 chamfered extremes of lower most long edge of pair of long edges 42 of first detachable strip 40
47 first perforation line
48 pair of first notches
50 chamfered extremes of upper most long edge of pair of long edges of first detachable strip 40
52 pair of first pull tabs of first detachable strip 40
54 return flap
56 pair of long edges of return flap 54
58 pair of short edges of return flap 54
60 inner surface of return flap 54
61 adhesive on inner surface 60 of return flap 54
62 top fold line
64 chamfered extremes of upper most long edge of pair of long edges 56 of return flap 54
66 second detachable strip
68 pair of long edges of second detachable strip 66
70 pair of short edges of second detachable strip 66
72 inner surface of second detachable strip 66
73 adhesive on inner surface 72 of second detachable strip 66
74 second perforation line
75 outer surface of second detachable strip 66
76 chamfered extremes of lower most long edge of pair of long edges 68 of second detachable strip 66
77 "TEAR THIS STRIP TO OPEN" indicia on outer surface 75 of second detachable strip 66
78 pair of second notches
79 chamfered extremes of upper most long edge of pair of long edges 68 of second detachable strip 66
80 pair of second pull tabs 80 of second detachable strip 66

DETAILED DESCRIPTION OF THE PREFERRED EMBODIMENT

Referring now to the figures in which like numerals indicate like parts, and particularly to FIGS. 1–5, the reusable business envelope of the present invention is shown generally at 10 and has an initial mailing modality where it is initially used and a return mailing modality where it is again used.

The reusable business envelope 10 includes a front panel 12 that is rectangular-shaped and has an outer surface 14, an inner surface 16, a pair of long edges 18 that are spaced-apart and parallel, and a pair of short edges 20 that are spaced-apart and parallel and perpendicular to and shorter than the pair of long edges 18 of the front panel 12.

The front panel 12 further has a first window 13 that is rectangular-shaped and disposed in close proximity to a short edge of the pair of short edges 20 of the front panel 12 and a lower most long edge of the pair of long edges 18 of the front panel 13, and provides viewing of a mailing address on a piece of correspondence in the reusable business envelope 10.

The front panel 12 further has a second window 15 that is slender, elongated, and rectangular-shaped and disposed between the first window 13 of the front panel 12 and the lower most long edge of the pair of long edges 18 of the front panel 12, and in close proximity to another short edge of the pair of short edges 20 of the front panel 12, and provides viewing of a bar code of the mailing address of the piece of correspondence in the reusable business envelope 10.

The front panel 12 further has a third window 17 that is rectangular-shaped and disposed between the second window 15 of the front panel 12 and an upper most long edge of the pair of long edges 18 of the front panel 12, and in close proximity to the another short edge of the pair of short edges 20 of the front panel 12, and provides viewing of a bar code of prepaid postage on the piece of correspondence in the reusable business envelope 10.

The reusable business envelope 10 includes a pair of side flaps 22 that are slender and rectangular-shaped and have chamfered short ends 24.

Each side flap of the pair of side flaps 22 has a long edge 26 that is coincident with and of similar length as a respective short edge of the pair of short edges 20 of the front panel 12, and forms therewith a side fold line 23.

The pair of side flaps 22 are folded inwardly, at the side fold lines 23, in overlying relationship onto the inner surface 16 of the front panel 12 when the reusable business envelope 10 is initially assembled so as to provide on each side flap of the pair of side flaps 22 an outer surface 28 that is exposed and has adhesive 29 thereon.

Depending upon the desired fabrication, the adhesive 29 on the outer surface 28 of each side flap of the pair of side flaps 22 is one of wet, moisten requiring type, and peel off release sheet type.

The reusable business envelope 10 further includes a rear panel 30 that is of similar size and shape as the front panel 12, and as a pair of long edges 32, a pair of short edges 34, and an outer surface 37.

A lower most long edge of the pair of long edges 32 of the rear panel 30 is coincident with and of similar length as the lower most long edge of the pair of long edges 18 of the front panel 12 and forms therewith a bottom fold line 35, with the pair of short edges 34 of the rear panel 30 being collinear with the pair of short edges 26 of the front panel 12.

An upper most long edge of the pair of long edges 32 of the rear panel 30 has chamfered extremes 36.

The rear panel 30 is folded upwardly, at the bottom fold line 35, in overlying relationship onto the inner surface 16 of the front panel 12, and is adhered to the adhesive 29 on the outer surface 28 of each side flap of the pair of side flaps 22 when the reusable business envelope 10 is initially assembled so as to provide a receptacle 38 for housing the piece of correspondence.

The receptacle 38 is defined by the front panel 12, the rear panel 30, a closed bottom created by the bottom fold line 35, a pair of closed sides created by the side fold lines 23, and an open top for providing access to the receptacle 38 and which is created by the spatial relationship between an upper most long edge of the pair of long edges 18 of the front panel 12 and an upper most long edge of the pair of long edges 32 of the rear panel 30.

The reusable business envelope 10 further includes a first detachable strip 40 that is slender, elongated, and rectangular-shaped and has a pair of long edges 42, a pair of short edges 44, an inner surface 43, and an outer surface 45.

A lower most long edge of the pair of long edges 42 of the first detachable strip 40 is coincident with and of similar length as the uppermost most long edge of the pair of long edges 32 of the rear panel 30 and forms therewith a first perforation line 47, with the pair of short edges 44 of the first detachable strip 40 being collinear with the pair of short edges 34 of the rear panel 30.

The lower most long edge of the pair of long edges 42 of the first detachable strip 40 has chamfered extremes 46 that form together with the chamfered extremes 36 of the upper most long edge of the pair of long edges 32 of the rear panel 30, a pair of first notches 48 that are V-shaped and inwardly tapering.

An upper most long edge of the pair of long edges 42 of the first detachable strip 40 has chamfered extremes 50 that together with the pair of short edges 44 of the first detachable strip 40 and the chamfered extremes 46 of the lower most long edge of the pair of long edges 42 of the first detachable strip 40 form a pair of first pull tabs 52.

The reusable business envelope 10 further includes a return flap 54 that is of similar shape and size as the first detachable strip 40, and has a pair of long edges 56 and a pair of short edges 58.

A lower most long edge of the pair of long edges 56 of the return flap 54 is coincident with and of similar length as the uppermost most long edge of the pair of long edges 18 of the front panel 12 and forms therewith a top fold line 62, with the pair of short edges 58 of the return flap 54 being collinear with the pair of short edges 26 of the front panel 12.

The return flap 54 further has an inner surface 60 that has adhesive 61 thereon that is intermittent so as to provide spaces for insertion of a letter opener to open the reusable business envelope 10 when the reusable business envelope 10 is used in its return mailing modality.

Depending upon the desired fabrication, the adhesive 61 on the inner surface 60 of the return flap 54 is one of wet, moisten requiring type, and peel off release sheet type.

The inner surface 60 of the return flap 54 abuts the inner surface 43 of the first detachable strip 40 when the reusable business envelope 10 is used in its initial mailing modality.

The return flap 54 is folded, at the top fold line 62, in overlying relationship onto the outer surface 37 of the rear panel 30, and adhered thereto by the adhesive 61 on the inner surface 60 of the return flap 54 when the reusable business envelope 10 is used in its return mailing modality.

An upper most long edge of the pair of long edges 56 of the return flap 54 has chamfered extremes 64.

The reusable business envelope 10 further includes a second detachable strip 66 that is of similar size and shape as the return flap 54 and has a pair of long edges 68, a pair of short edges 70, an inner surface 72 that has adhesive 73 thereon, and an outer surface 75 that has "TEAR THIS STRIP TO OPEN" indica 77 thereon.

A lower most long edge of the pair of long edges 68 of the second detachable strip 66 is coincident with and of similar length as an uppermost most long edge of the pair of long edges 56 of the return flap 54 and forms therewith a second perforation line 74, with the pair of short edges 70 of the second detachable strip 66 being collinear with the pair of short edges 58 of the return flap 54.

The lower most long edge of the pair of long edges 68 of the second detachable strip 66 has chamfered extremes 76 that form together with the chamfered extremes 64 of the upper most long edge of the pair of long edges 56 of the return flap 66, a pair of second notches 78 that are V-shaped and inwardly tapering.

An upper most long edge of the pair of long edges 68 of the second detachable strip 66 has chamfered extremes 79 that together with the pair of short edges 70 of the second detachable strip 66 and the chamfered extremes 76 of the lower most long edge of the pair of long edges 68 of the second detachable strip 66 form a pair of second pull tabs 80.

The second detachable strip 66 is folded downwardly, at the second perforation line 74, in overlying relationship onto the outer surface 45 of the first detachable strip 40 and is adhered thereto by the adhesive 73 on the inner surface 72 of the second detachable strip 66 when the reusable business envelope 10 is in its initial mailing modality, with the reusable business envelope 10 achieving its return mailing modality by the sideward pulling of one tab of the pair of first pull tabs 52 of the first detachable strip 40 and an adhered tab of the pair of second pull tabs 80 of the second detachable strip 66 as a unit, causing the first detachable strip 40 and the adhered second detachable strip 66 to be removed as a unit by severing the first perforation line 47 and the second perforation line 74 and thereby exposing the open top of the receptacle 38 for insertion of another piece of correspondence, with the return flap 54 folded downwardly, at the top fold line 62, in overlying relationship onto the outer surface 37 of the rear panel 30, and adhered thereto by the adhesive 61 on the inner surface 60 of the return flap 54.

It will be understood that each of the elements described above, or two or more together, may also find a useful application in other types of constructions differing from the types described above.

While the invention has been illustrated and described as embodied in a reusable envelope, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A reusable business envelope having an initial mailing modality where it is initially used and a return mailing modality where it is again used, comprising:

a) a front panel; said front panel being rectangular-shaped and having an outer surface, an inner surface, a pair of long edges being spaced-apart and parallel, and a pair of short edges being spaced-apart and parallel, and perpendicular to and shorter than said pair of long edges of said front panel; said front panel further having a first window being rectangular-shaped and disposed in close proximity to a short edge of said pair of short edges of said front panel and a lower most long edge of said pair of long edges of said front panel, and providing viewing of a mailing address on a piece of correspondence in said reusable business envelope;

b) a pair of side flaps foldably mounted to said front panel;

c) a rear panel foldably mounted to said front panel;

d) a first detachable strip detachably mounted to said rear panel;

e) a return flap foldably mounted to said front panel; and f) a second detachable strip detachably mounted to said return flap.

2. The envelope as defined in claim 1, wherein said front panel further has a second window that is slender, elongated, and rectangular-shaped and disposed between said first window of said front panel and said lower most long edge of said pair of long edges of said front panel, and in close proximity to another short edge of said pair of short edges of said front panel, and provides viewing of a bar code for the mailing address on the piece of correspondence in said reusable business envelope.

3. The envelope as defined in claim 2, wherein said front panel further has a third window that is rectangular-shaped and disposed between said second window of said front panel and an upper most long edge of said pair of long edges of said front panel, and in close proximity to said another short edge of said pair of short edges of said front panel, and provides viewing of a bar code for prepaid postage on the piece of correspondence in said reusable business envelope.

4. The envelope as defined in claim 1, wherein said pair of side flaps are slender and rectangular-shaped and have chamfered short ends.

5. The envelope as defined in claim 1, wherein each side flap of said pair of side flaps has a long edge that is coincident with and of similar length as a respective short edge of said pair of short edges of said front panel, and a forms therewith a side fold line.

6. The envelope as defined in claim 5, wherein said pair of side flaps are folded inwardly, at said side fold lines, in overlying relationship onto said inner surface of said front panel when said reusable business envelope is initially assembled so as to provide on each side flap of said pair of side flaps an outer surface that is exposed and has adhesive thereon.

7. The envelope as defined in claim 6, wherein said adhesive on said outer surface of each side flap of said pair of side flaps is one of wet and moisten requiring type.

8. The envelope as defined in claim 6, wherein said rear panel is of similar size and shape as said front panel, and as a pair of long edges, a pair of short edges, and an outer surface.

9. The envelope as defined in claim 8, wherein a lower most long edge of said pair of long edges of said rear panel is coincident with and of similar length as a lower most long edge of said pair of long edges of said front panel and forms therewith a bottom fold line, with said pair of short edges of said rear panel being collinear with said pair of short edges of said front panel.

10. The envelope as defined in claim 9, wherein an upper most long edge of said pair of long edges of said rear panel has chamfered extremes.

11. The envelope as defined in claim 10, wherein said rear panel is folded upwardly, at said bottom fold line, in overlying relationship onto said inner surface of said front panel, and is adhered to said adhesive on said outer surface of each side flap of said pair of side flaps when said reusable business envelope is initially assembled so as to provide a receptacle for housing a piece of correspondence.

12. The envelope as defined in claim 11, wherein said receptacle is defined by said front panel, said rear panel, a closed bottom created by said bottom fold line, a pair of closed sides created by said side fold lines, and an open top for providing access to said receptacle and which is created by the spatial relationship between an upper most long edge of said pair of long edges of said front panel and an upper most long edge of said pair of long edges of said rear panel.

13. The envelope as defined in claim 10, wherein said first detachable strip is slender, elongated, and rectangular-shaped and has a pair of long edges, a pair of short edges, an inner surface, and an outer surface.

14. The envelope as defined in claim 13, wherein a lower most long edge of said pair of long edges of said first detachable strip is coincident with and of similar length as an uppermost most long edge of said pair of long edges of said rear panel and forms therewith a first perforation line, with said pair of short edges of said first detachable strip being collinear with said pair of short edges of said rear panel.

15. The envelope as defined in claim 14, wherein said lower most long edge of said pair of long edges of said first detachable strip has chamfered extremes that form together with said chamfered extremes of said upper most long edge of said pair of long edges of said rear panel, a pair of first notches that are V-shaped and inwardly tapering.

16. The envelope as defined in claim 15, wherein an upper most long edge of said pair of long edges of said first detachable strip has chamfered extremes that together with said pair of short edges of said first detachable strip and said chamfered extremes of said lower most long edge of said pair of long edges of said first detachable strip form a pair of first pull tabs.

17. The envelope as defined in claim 16, wherein said return flap is of similar shape and size as said first detachable strip, and has a pair of long edges and a pair of short edges.

18. The envelope as defined in claim 17, wherein a lower most long edge of said pair of long edges of said return flap is coincident with and of similar length as an uppermost most long edge of said pair of long edges of said front panel and forms therewith a top fold line, with said pair of short edges of said return flap being collinear with said pair of short edges of said front panel.

19. The envelope as defined in claim 18, wherein said return flap has an inner surface that has adhesive thereon that is intermittent so as to provide spaces for insertion of a letter opener to open said reusable business envelope when said reusable business envelope is used in its return mailing modality.

20. The envelope as defined in claim 19, wherein said adhesive on said inner surface of said return flap is one of wet and moisten requiring type.

21. The envelope as defined in claim 19, wherein said inner surface of said return flap abuts said inner surface of said first detachable strip when said reusable business envelope is used in its initial mailing modality.

22. The envelope as defined in claim 19, wherein said return flap is folded, at said top fold line, in overlying relationship onto said outer surface of said rear panel, and adhered thereto by said adhesive on said inner surface of said return flap when said reusable business envelope is used in its return mailing modality.

23. The envelope as defined in claim 19, wherein an upper most long edge of said pair of long edges of said return flap has chamfered extremes.

24. The envelope as defined in claim 23, wherein said second detachable strip is of similar size and shape as said return flap and has a pair of long edges, a pair of short edges, an inner surface that has adhesive thereon, and an outer surface that has "TEAR THIS STRIP TO OPEN" indica thereon.

25. The envelope as defined in claim 24, wherein a lower most long edge of said pair of long edges of said second detachable strip is coincident with and of similar length as an uppermost most long edge of said pair of long edges of said return flap and forms therewith a second perforation line, with said pair of short edges of said second detachable strip being collinear with said pair of short edges of said return flap.

26. Ache envelope as defined in claim 25, wherein said lower most long edge of said pair of long edges of said second detachable strip has chamfered extremes that form together with said chamfered extremes of said upper most long edge of said pair of long edges of said return flap, a pair of second notches that are V-shaped and inwardly tapering.

27. The envelope as defined in claim 26, wherein an upper most long edge of said pair of long edges of said second detachable strip has chamfered extremes that together with said pair of short edges of said second detachable strip and said chamfered extremes of said lower most long edge of said pair of long edges of said second detachable strip form a pair of second pull tabs.

28. The envelope as defined in claim 27, wherein said second detachable strip is folded downwardly, at said second perforation line, in overlying relationship onto said outer surface of said first detachable strip and is adhered thereto by said adhesive on said inner surface of said second detachable strip when said reusable business envelope is in its initial mailing modality, with said reusable business envelope achieving its return mailing modality by the sideward pulling of one tab of said pair of first pull tabs of said first detachable strip and an adhered tab of said pair of second pull tabs of said second detachable strip as a unit, causing said first detachable strip and said adhered second detachable strip to be removed as a unit by severing said first perforation line and said second perforation line and thereby exposing said open top of said receptacle for insertion of another piece of correspondence, with said return flap folded downwardly, at said top fold line, in overlying relationship onto said outer surface of said rear panel, and adhered thereto by said adhesive on said inner surface of said return flap.

* * * * *